C. V. HONECKER.
SOLID TIRE.
APPLICATION FILED OCT. 6, 1919.
1,408,701.
Patented Mar. 7, 1922.
2 SHEETS—SHEET 1.
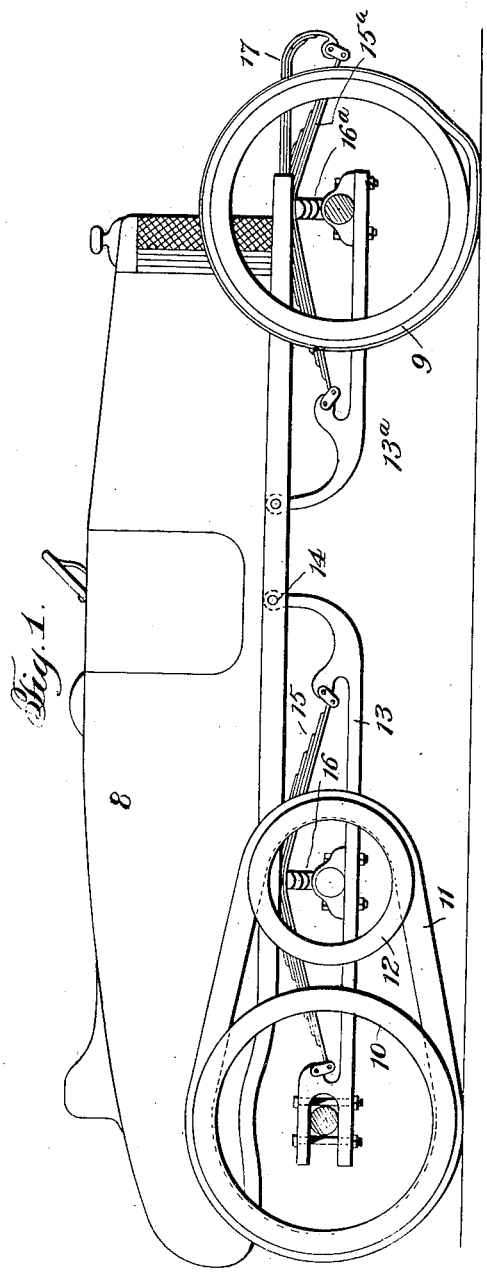
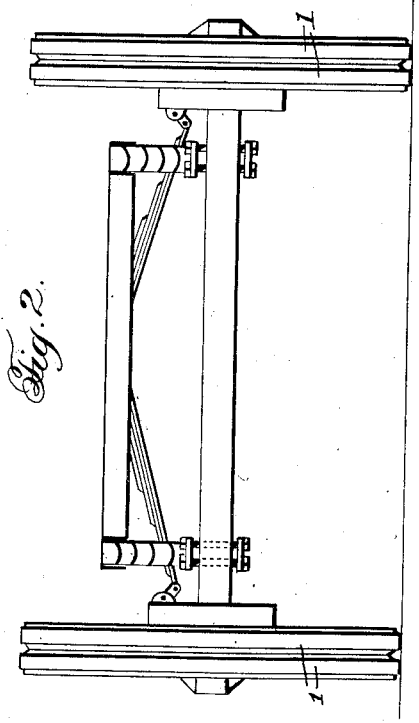
Witness:
Jas E. Hutchinson
Inventor
Carl V. Honecker
By
Munn & Co
Attorneys.

C. V. HONECKER.
SOLID TIRE.
APPLICATION FILED OCT. 6, 1919.
1,408,701.
Patented Mar. 7, 1922.
2 SHEETS—SHEET 2.
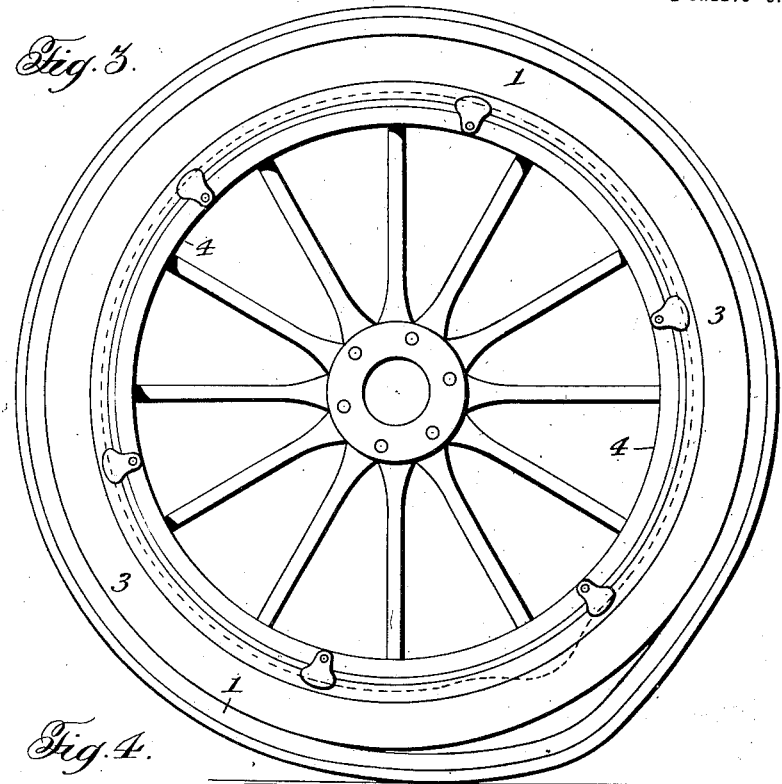
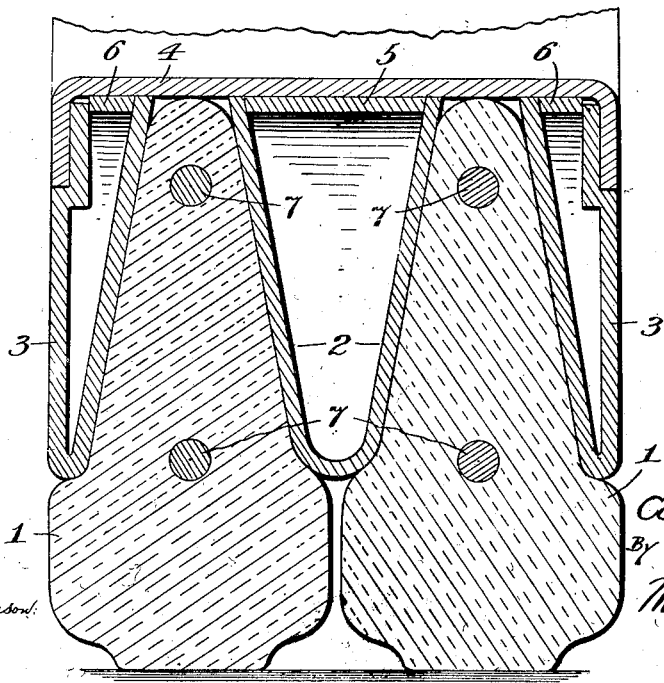
Inventor:
Carl V. Honecker,
By
Munn & Co
Attorneys
Witness:
Jas. E. Hutchinson

UNITED STATES PATENT OFFICE.

CARL V. HONECKER, OF BROOKVILLE, INDIANA.

SOLID TIRE.

1,408,701.  Specification of Letters Patent.  Patented Mar. 7, 1922.

Application filed October 6, 1919. Serial No. 328,762.

*To all whom it may concern:*

Be it known that I, CARL V. HONECKER, a citizen of the United States, and a resident of Brookville, in the county of Franklin and State of Indiana, have invented certain new and useful Improvements in Solid Tires, of which the following is a specification.

My invention is an improvement in solid tires, and has for its object to provide a tire of the character specified, wherein a solid tire is used, so arranged on the wheel that movement of the tire with respect to the wheel will cushion the jolt and jar of the vehicle, permitting the easily punctured and expensive pneumatic tire to be dispensed with.

In the drawings:—

Figure 1 is a side view of a motor vehicle provided with the improved tires,

Figure 2 is a rear view with the body detached,

Figure 3 is a front view of a wheel constructed in accordance with the improvement, and Figure 4 is an enlarged transverse section through the rim and felly.

The invention forming the subject matter of this application is in the nature of a wheel having a rim provided with novel means for supporting tread elements designated by the numeral 1. With reference to Figure 4, it will be observed that the tread elements 1 are provided with attaching portions which are tapered inwardly and which are received within grooves formed in a novel type of rim. The outer portions of the tread elements are enlarged somewhat and bear against the rounded outer edges of the rim.

As shown more particularly in Figures 3 and 4, the tire is of enough greater diameter than the rim to fit loosely about the rim in such manner that as the said tire engages the road during the running of the vehicle, a portion of the tire just in front of the point of engagement will bulge or pouch out as shown. That is, the tire whether a single or multiple section is loose enough on the rim to creep during the movement of the wheel under road conditions.

That part of the tire which bulges is withdrawn from the groove, and as the wheel rides upon the bulge, the tire is forced back into the groove. There is some resistance to this return movement, and this resistance provides cushioning for the vehicle.

The grooves are formed by spaced intermediate and outer annuli 2 and 3 for a double section tire, the section 2 being the central section while the sections 3 are lateral sections. These three sections are held upon a rim 4 which may be of ordinary construction, or may be a quick demountable type. The section 2 is substantially V-shaped in cross section, and the free edges of the side walls of the V engage the peripheral surface of the rim 4, and a ring 5 is arranged on the rim between the side walls for holding them in proper spaced relation.

The sections 3 are also substantially V-shaped in cross section and the side walls thereof are held spaced by rings 6. Each of the outer walls of each lateral section has an inwardly offset portion at the edge adjacent to the rim, for receiving a lateral flange of the rim, the arrangement being such that the outer face of the flange is flush with the outer face of the wall of the section.

Referring to Figure 4, it will be noted that the tire sections are reinforced as indicated at 7. On light cars a single section of tire will be used, while on heavy vehicles two or three may be used as may be found desirable. In case of injury as for instance from a cut, damage may only result to one section. The rim 4 is the usual type of split rim and the sections 2 and 3 together with the tire sections are assembled about the rim and the rim is expanded.

The tire is of such internal diameter, that there is sufficient slack to permit of withdrawal and reinsertion of the tire in the groove. In Figure 1 the body 8 of the vehicle is supported by front wheels 9 which have the improved tire, and by rear wheels 10 which are the traction wheels. These wheels have the grooved rims as shown in Figure 4, and the tire sections 11 of the rear wheel which correspond in construction and cross sectional shape to the tire shown in Figure 4 pass over a driven wheel 12 which is driven by the motor.

This wheel 12 is constructed in the same manner as the wheel 10, having the grooves for receiving the tire or tire sections. In the construction of Figure 1, the driving wheel 12 is carried by a frame construction 13 which is supported at its rear end by the rear axle housing, and at its front end is pivoted to the frame as indicated at 14.

A semi-cylindrical spring is arranged between this frame at each side and the body, and another spring 16 is arranged at the center of the spring 15. At the front the spring is similar, the frame 13ª being supported by the front axle housing and the frame of the body, and the transverse spring 16ª corresponding to the spring 16 is arranged at the axle. At the rear the spring 16 is arranged at the drive wheel. The front ends of the semi-elliptical springs 15ª at the front are connected to cantilever supports 17.

I claim :—

1. A wheel comprising a rim having outwardly directed flanges, intermediate and outer annuli arranged in spaced relation about said rim and having their opposed sides inclined thereby forming a pair of spaced annular outwardly expanding grooves, spacing rings arranged between the inner edges of said annuli, and tread elements having portions fitted within said grooves, said flanges being engaged with the inner edge portions of said outer annuli.

2. A wheel comprising a rim having outwardly directed flanges, intermediate and outer annuli arranged in spaced relation about said rim and having their opposed sides inclined, thereby forming a pair of spaced annular grooves, spacing rings arranged between the inner edge portions of said annuli, yieldable tread elements having their inner edge portions fitted within said grooves, the outer faces of said outer annuli being offset and fitting within said flanges.

3. In combination with a wheel including a demountable rim, said rim provided with an annular outwardly expanding peripheral groove, of a tire comprising an endless band of solid resilient material adapted to fit loosely in said groove, the internal diameter of said tire being of such relatively greater diameter than the greatest diameter of the rim, whereby said tire is caused to bulge forwardly from the rim in advance of its road point of contact and said bulged portion progressively forced back into the said groove of the rim and eliminate shock or jar from the roadway to the vehicle carrying said wheel.

4. A wheel comprising a rim having outwardly directed annular flanges at its lateral edges, substantially wedge shaped intermediate and outer annuli disposed circumferentially on said rim and in spaced relation, said spaced annuli defining outwardly expanding grooves, yieldable tread elements having portions fitted within said grooves, the outer faces of said outer annuli having annular shouldered portions fitted within said annular flanges on the rim.

CARL V. HONECKER.